United States Patent Office 3,103,526
Patented Sept. 10, 1963

3,103,526
PREPARATION OF ALKYL COMPOUNDS OF BORON, MERCURY, AND BISMUTH
Herbert Jenkner, Hannover-Wülfel, Germany, assignor to Kali-Chemie Aktiengesellschaft, Hannover, Germany
No Drawing. Filed Oct. 7, 1957, Ser. No. 688,418
Claims priority, application Germany Oct. 10, 1956
7 Claims. (Cl. 260—431)

The invention relates to the preparation of alkyls of elements of the second to fifth group of the periodic system.

According to the invention, chlorides of said elements are reacted with aluminum alkyls in the presence of alkali metal chlorides. In this way, the alkyls of boron, mercury, gallium, tin, silicon, germanium, arsenic, antimony, bismuth and other elements of the second to fifth group of the periodic system are readily obtained.

The reaction proceeds, for instance, according to the following equations:

(1) $BCl_3 + AlR_3 + NaCl \rightarrow BR_3 + NaAlCl_4$ (2) $3HgCl_2 + 2AlR_3 + 2NaCl \rightarrow 3HgR_2 + 2NaAlCl_4$ (3) $AsCl_3 + AlR_3 + NaCl \rightarrow AsR_3 + NaAlCl_4$ (4) $SnCl_4 + 2AlR_3 + 2NaCl \rightarrow SnR_4 + 2NaAlRCl_3$ (5) $3SnCl_4 + 4AlR_3 + 4NaCl \rightarrow 3SnR_4 + 4NaAlCl_4$ In the above equations, R is an alkyl containing 1–12, preferably 1–4 C atoms.

If the above reactions are carried out without the addition of alkali metal chloride, aluminum chloride is formed as reaction product, which interferes with the process by side-reactions and particularly by clogging the apparatus.

The addition of alkali metal chloride according to the invention has the considerable advantage to convert $AlCl_3$ formed as intermediate reaction product in statu nascendi to a complex compound which is much less volatile than the aluminum chloride; even at high reaction temperatures, said complex or addition compounds do not clog the apparatus, they are readily removed and do not enter into side reactions with the reactants. Therefore, they allow of obtaining the alkyl compounds in high yields and in very pure condition with substantially complete conversion of the alkyl groups of the aluminum alkyls, which renders this type of reaction available for commercial production.

Instead of aluminum trialkyls, their etherates, and alkylaluminum chlorides may also be used. Instead of sodium chloride, other alkali metal chlorides may be employed, such as potassium or lithium chloride. Though I prefer to carry out the alkylation reaction in the presence of the alkali metal halide, the latter may also be added after the alkylation has been terminated, in order to react with the formed aluminum chloride.

Whenever chlorides are recited in the specification, the respective bromides react in the same manner.

It is obvious that not only the halides of the above recited elements can be reacted with aluminum alkyls but also the partially alkylated halides. Such a reaction is, for instance, illustrated by the equation (6) $2(CH_3)_2SiCl_2 + (CH_3)_2AlCl + NaCl$
$\rightarrow 2(CH_3)_3SiCl + NaAlCl_4$ The reaction may be carried out at atmospheric or elevated pressure, and solvents, diluents or suspending mediums may be used. Suitable solvents are organic solvents which do not react with the components of the reaction, and preferably liquids having a boiling point sufficiently different from the boiling point of the obtained alkyl compound for ready separation. Suitable solvents are, for instance, aliphatic hydrocarbons such as hexane, heptane, octane; aromatic hydrocarbons such as benzene, toluene, methyl naphthalene; halogenated hydrocarbons such as methylene chloride, chloroform, chlorobenzene. Also alicyclic compounds, such as cyclohexane and methyl cyclohexane, ethers, and mineral oils, particularly the high boiling mineral oils ($b_{.1}=180$—$250°$ C.) may be used as solvents. In some cases, it may be of advantage to use as solvent the alkyl compound obtained as reaction product.

If a solvent is used, the reaction may be carried out by providing a solution of the aluminum alkyl and alkali metal halide and introducing the halide to be alkylated in the solid, liquid, or gaseous state into said solution. Conversely, a solution or suspension of said halide may be prepared first and then the aluminum alkyl may be added as such or in solution.

The reaction temperature depends on the specific reactants used and is in the range of about 20 to 500° C. Generally, the reaction will be carried out at atmospheric pressure, but lower or higher pressures may also be applied.

The following examples are given to illustrate the invention, but it should be understood that these are given by way of illustration only and not of limitation, and that many variations in the compounds given and in the reaction conditions and amounts indicated can be made without departing from the spirit of the invention and the scope of the appended claims. All parts are given by weight, unless indicated otherwise.

Example 1

57 parts of triethyl aluminum were dissolved in 250 parts of methylnaphthalene, and 29 parts of sodium chloride were added with stirring. Then, a total amount of 58 parts of borontrichloride was slowly introduced.

On distilling the solution, 43.5 parts of pure triethyl borine (=89% of theory) were recovered. The triethyl borine contained less than .1 percent of chlorine.

The methylnaphthalene used as solvent could be distilled off from the sodium aluminum chloride under reduced pressure.

If the reaction was repeated under the same conditions but without addition of sodium chloride, 23.5 parts of triethyl borine (=48% of theory) were obtained. The chlorine content of the triethyl borine was 3.2 percent; the methylnaphthalene was pitch-black and could not be separated from the aluminum chloride.

Example 2

350 parts of sodium chloride were introduced into a solution of 580 parts of triethyl aluminum in 2500 parts of methylene chloride; subsequently, 550 g. of boron trichloride were passed with stirring into said solution at a temperature of 40–50° C.

After removal of the solvent, 405 parts of triethyl borine were obtained, which had a chlorine content of less than .3 percent.

If instead of boron trichloride, an etheric solution of gallium trichloride was used, triethyl gallium was obtained in good yields.

Example 3

170 parts of sodium chloride were added to a solution of 300 parts of triethyl aluminum in 680 parts of triethyl borine. Into said solution, there were passed 290 parts of boron trichloride at a temperature of 100° C.

220 parts of pure chlorine-free triethyl borine were obtained (=91% of theory). The triethyl borine used as solvent for the triethyl aluminum was quantitatively recovered (680 parts).

If the reaction was carried out under the same conditions but without sodium chloride, the yield of triethyl borine dropped by about 10 percent and the triethyl borine contained about 2 percent of chlorine. In addition, aluminum chloride (which is substantially insoluble in triethyl borine) was deposited in the cooler and receiver. Moreover, the distillate contained about 2 to 4 percent of alkyl aluminum chlorides.

The reaction trialkyl aluminum+boron trichloride+sodium chloride can be also readily carried out under pressure in an autoclave, whereby also yields of more than 90 percent of trialkyl borine are obtained.

If the solution of triethyl aluminum in triethyl borine is replaced by a solution of tributyl aluminum in tributyl borine, the yield of tributyl borine is more than 90 percent of the theory. Without sodium chloride, the tributyl borine-aluminum chloride mixture was difficult to separate, and clogging took place during distillation.

*Example 4*

203.6 g. of mercuric chloride were slowly added to 57 g. of triethyl aluminum, into which 23 g. of sodium chloride had been introduced with stirring. At the beginning of the exothermic reaction, the temperature was kept between 30 and 40° C., and at the end between 70 and 80° C. By vacuum distillation, 175 g. of pure chlorine-free mercury diethyl were distilled off from the $NaAlCl_4$ residue, corresponding to a yield of more than 90 percent.

*Example 5*

The same amounts of reactants were used as in Example 4 but 90 cc. of methylene chloride were added as solvent or diluent for the triethyl aluminum. There were obtained 168 g. of diethyl mercury ($m_{.5}=26°$ C.).

If instead of methylene chloride, diethyl mercury was used as a solvent for the aluminum alkyl, the yields were also more than 90%.

In the same way, a mixture of diethyl mercury and mercuric chloride (formation of ethyl mercury chloride) may be reacted with triethyl aluminum. Also in this case, the yields are in excess of 90%.

If, instead of triethyl aluminum, trimethyl or tripropyl aluminum, or diethyl aluminum chloride is reacted with mercuric chloride or alkyl mercury chloride according to Examples 4 or 5, in each case the corresponding mercury alkyls are obtained in more than 85% yield.

If in Example 4 the addition of sodium chloride for complexing the formed aluminum chloride was omitted, only 16 g. of a reaction product containing 31 percent of chlorine were obtained.

*Example 6*

According to the equation:

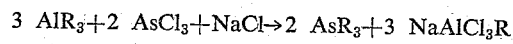

a solution of 60.5 g. of arsenic trichloride in 100 cc. of hexane were added dropwise to a solution of 57 g. of triethyl aluminum in 150 cc. of hexane, which contained, in addition, 33 g. of sodium chloride in suspension. The reaction temperature was 70–80° C. After distilling off the solvent, 42 parts of triethyl arsine, which contained 1 percent of chlorine, were obtained by distillation. The yield was in excess of 80% of theory.

If the reaction was carried out in the absence of sodium chloride, the triethyl arsine distillate contained 32 percent of chlorine.

If the arsenic trichloride was replaced by antimony chloride, triethyl stibine was obtained in equally good yield.

*Example 7*

54.8 parts of bismuth trichloride were gradually added to a mixture of 29.7 parts of triethyl aluminum, 83 parts of hexane, and 16 parts of sodium chloride. The reaction temperature was 50–70° C.

After removal of the solvent, 43 parts (=more than 85% of theory) of pure chlorine-free triethyl bismuth were obtained.

If the sodium chloride was omitted, the yield was only 32 percent, and the distillate contained about 6 percent of chlorine.

*Example 8*

33 parts of sodium chloride were added to a solution of 57 parts of triethyl aluminum in 150 cc. of hexane. Subsequently, a solution of 65.2 parts of tin tetrachloride in 100 cc. of hexane was added drop by drop at a temperature of 60–80° C. An immediate reaction took place; after the reaction had been substantially completed, 10 parts of $AlCl_3$ and then 10 parts of sodium chloride were added.

From the reaction mass, 50 parts of tetraethyl tin (more than 87% of the theory) were recovered by distillation.

*Example 9*

A solution of 130.5 parts of tin tetrachloride in 100 cc. of hexane was added dropwise with stirring to a solution of 57 parts of aluminum triethyl in 150 cc. of hexane. The exothermic reaction was kept at a temperature of 40–80° C., whereby a dark lower and a colorless upper layer was formed. After addition of 30 parts of sodium chloride, the lower layer cleared up, whereupon the solvent was distilled off. From the residue, triethyl tin monochloride was obtained in a yield of more than 85 percent; in addition, 10 percent of diethyl tin dichloride were obtained. The total distillate amounted to 110 parts.

*Example 10*

In similar manner as described in Example 2, 57 parts of triethyl aluminum were reacted at 40–80° C. with 195.4 parts of tin tetrachloride (solvent 250 cc. of hexane). After completion of the reaction, 30 parts of sodium chloride were added, and the solvent was distilled off. By distillation of the residue, 166 parts of diethyl tin dichloride, which could be further alkylated with triethyl aluminum, and 6 parts of a mixture of tetraethyl tin and triethyl tin monochloride were obtained.

*Example 11*

330 g. of sodium chloride were added to solution of 570 g. of triethyl aluminum in 593 g. of tetraethyl tin; subsequently, a mixture of 652 g. of tin tetrachloride and 1763 g. of tetraethyl tin (formation of ethyl tin chlorides) was added dropwise. The temperature of the exothermic reaction was maintained at 80–95° C. The reaction mixture remained colorless during the whole time.

On distillation, the tetraethyl tin used as a solvent was recovered and 540 g. of additional tetraethyl tin were obtained, corresponding to a yield of 91%. The chloride content of the distilled tetraethyl tin was below .2%.

*Example 12*

A mixture of 2645 g. of tetraethyl tin and 978 g. of tin tetrachloride was added, drop by drop with stirring, to a mixture of 570 g. of triethyl aluminum and 330 g. of sodium chloride. The reaction temperature was 80–90° C. Tetraethyl tin was obtained by distillation in a yield of 86 percent. $NaAlCl_4$ remained as a white residue.

*Example 13*

33 g. of sodium chloride were added to a solution of 57 g. of triethyl aluminium in 150 cc. of methylene chloride. Then a solution of 65.2 g. of tin tetrachloride in 100 cc. of methylene chloride was added dropwise with stirring. The reaction temperature was 40–45° C. After evaporation of the methylene chloride, 57 g. (=93.5% of the theory) of tetraethyl tin were recovered by distillation. The chlorine content was .4%.

If the example was repeated but without the addition of sodium chloride, a dark brown reaction mixture, instead of a colorless mixture, was obtained, and the distillation product contained a large amount of aluminium and chloride.

If the sodium chloride was not added at the start of the reaction but immediately prior to distillation, a completely colorless tetraethyl tin was obtained, and in addition some triethyl tin monochloride and diethyl tin dichloride.

*Example 14*

To a solution of 57 g. of triethyl aluminium in 250 cc. of methylene chloride, there were added 41 g. of potassium chloride with stirring; subsequently, a solution of 98 g. of tin tetrachloride in 100 cc. of methylene chloride was added drop by drop at such a rate that a gentle methylene chloride reflux was maintained. After evaporation of the solvent, 69 g. of tetraethyl tin (80% of theory) were obtained by distillation.

*Example 15*

140 parts of trioctyl aluminium were dissolved in 200 parts of hexane and subsequently 22.5 parts of NaCl added. With stirring and heating up to 60–80° C. a total of 45 parts of $BCl_3$ were introduced. After cooling the brown solution above the solid was removed therefrom, the residue washed with hexane, the solvents combined and distilled under normal pressure. By distillation in vacuo (boiling point 147–152° C. at 0.6 mm. Hg) 108 parts of boron trioctyl were obtained.

It can be followed from the above example that aluminium alkyl may also be used, the alkyl groups of which containing more than 4 up to 12 C atoms, at least as far as boron chlorides and tin chlorides are reacted according to the invention.

*Example 16*

35 parts of tributyl aluminium and 11 parts of sodium chloride were mixed with 60 parts of methylene chloride. Then, a mixture of 30.4 parts of tin tetrachloride in 60 parts of methylene chloride were added dropwise with stirring and reflux condensation. After the reaction was completed, first the solvent and then the obtained tetrabutyl tin was distilled off. 39.6 parts of tetrabutyl tin were obtained, corresponding to a yield of 97 percent.

*Example 17*

The reaction was carried out in an iron reaction vessel of about 30 liter capacity; the vessel was filled with a solution of 1000 g. of $SnCl_4$ in 5000 g. of mineral oil ($b_{.1}$=190–210° C.), in which 1820 g. of NaCl were suspended, and a solution of 3360 g. of triethyl aluminum in 3000 g. of the same mineral oil was added in such a way that after addition of about each 1000–2000 g. of the $Al(C_2H_5)_3$-mineral oil mixture another amount of 1000 g. of $SnCl_4$ was introduced. The temperature was kept at about 100–110° C. In this way, a total amount of 5480 g. of $SnCl_4$ was reacted with 3360 g. of $$Al(C_2H_5)_3$$

within 2 hours. By distillation in vacuo, 4692 g. of $Sn(C_2H_5)_4$ were obtained, corresponding to a yield of 95.3%.

Without opening the reaction vessel, fresh amounts of $SnCl_4$, NaCl, and $Al(C_2H_5)_3$ were introduced into the mineral oil-$NaAlC_4$ mixture which had remained in the vessel after the vacuum distillation. The procedure was the same as described for the first step. In this way, further 5680 g. of $SnCl_4$ and 3480 g. of $Al(C_2H_5)_3$ were brought to reaction, whereby in this step the triethyl aluminum was added in the undiluted state. Also in this second step, the yield was more than 95 percent of the theory.

After cooling down of the reaction vessel, the greater portion of the mineral oil used as diluent could be siphoned off from the solid residue.

If $Sn(C_2H_5)_4$ is used as a diluent, instead of mineral oil, it is of advantage to add mineral oil before $$Sn(C_2H_5)_4$$

is distilled off in order to obtain a substantially complete distillation. For a complete removal of the tetraethyl tin, it is also possible to extract the residue with hexane, light benzene, or the like.

*Example 18*

57 parts of triethyl aluminum were heated in an autoclave at 300° C. for 1 hour with 127.5 parts of $SiCl_4$ and 30 parts of NaCl. 85 parts of a mixture of silanes was obtained, consisting of about 12% $RSiCl_3$
20% $R_2SiCl_2$    R=ethyl
63% $R_3SiCl$
Balance $SiR_4$ In addition, 102 parts of almost colorless $NaAlCl_4$ were obtained as by-product, which remained as solid residue in the autoclave after release of the pressure and cooling to room temperature. On hydrolysis, said residue did not develop ethane; this shows that the conversion of the triethyl aluminum was quantitative.

*Example 19*

57 parts of triethyl aluminum were reacted with 85 parts of $SiCl_4$ and 30 parts of NaCl at 250–290° C. in the same apparatus as used in Example 18. The reaction time was 1.5 hours.

There was obtained a mixture of silanes containing about 31 percent of $R_3SiCl$ and 61 percent of $SiR_4$. In addition, 4 percent of a mixture consisting of $R_2SiCl_2$ and $RSiCl_3$ were obtained. The balance consisted of silicon compounds, which contained, in addition to Si—O—, also Si—C—Si linkages. The conversion calculated on the triethyl aluminum was quantitative.

*Example 20*

The reaction was carried out as described in Example 18 but $SiCl_4$ was replaced by diethyldichlorosilane. Also in this reaction, the conversion, calculated on $Al(C_2H_5)_3$, was quantitative; $NaAlCl_4$ obtained as residue did not develop any ethane on hydrolysis.

The reaction proceeds with substantially the same yields if diethyl aluminum chloride is used instead of triethyl aluminum.

*Example 21*

A mixture of 57 parts of triethyl aluminum and 127 parts of $SiCl_4$ was added dropwise to a suspension of 30 parts of sodium chloride in 175 parts of a mineral oil ($b_1$=190—210° C.), which had been heated under stirring to 220–230° C. There were obtained 113 parts of ethyl chlorosilanes containing 58.8 percent of Cl ($SiCl_4$=83.5% Cl)

The reaction residue consisted of a solid precipitate (which was liquid during the reaction), from which the supernatant oil diluent could be separated by simple decantation.

*Example 22*

209 parts of phenyl trichlorosilane and 100 parts of the mineral oil used in Example 21 were mixed. Subsequently, 20 parts of sodium chloride were added to said mixture, and 37.6 parts of triethyl aluminum were dropped in within .5 hour at 210° C. with stirring. 168 parts of a mixture of phenylethylchlorosilanes were obtained; the Cl content was 34.6 percent, compared with 50.4 percent of the phenyltrichlorosilane used as starting material.

If it is desired to prepare methyl silanes, the triethyl aluminium and diethyl aluminium chloride has to be replaced in the above examples by trimethyl aluminium and dimethyl aluminium chloride, respectively, in the corresponding mol ratio.

*Example 23*

5 parts of germanium tetrachloride, dissolved in 20 parts of hexane, were heated to boiling temperature with addition of 1.8 parts of sodium chloride, then 3.54 parts of triethyl aluminium were added dropwise with stirring within two hours. The reaction started at once. After cooling, the supernatant solution was decanted from the colorless solid residue which consisted essentially of $NaAlCl_4$. After removal of the hexane, 3.9 parts of tetraethyl germane (=88.7% of theory) were obtained by distillation.

The term "halide" of the 2d to 5th group elements, as used in the specification and claims, is intended to include also the alkyl halides of said elements, such as alkyl boron halides, alkyl tin halides, alkylchlorosilanes.

What I claim is:

1. In the preparation of alkyls of an element selected from the group consisting of mercury, boron, and bismuth by reaction of a chlorine compound of said element of the formula $$R_xElCl_y$$

wherein El is one of said elements, $x+y=$ the valence of El, $y$ is an integer from 1 to the valence of El, $x$ is an integer from 0 to valence of El—1, and R is a lower alkyl group, with an aluminum alkyl compound selected from the group consisting of compounds of the formula $$R'_zAlCl_{3-z}$$

wherein R' is alkyl having 1 to 12 carbon atoms, $z$ is an integer from 1 to 3, and etherates of said compounds at a temperature of about 20 to 500° C., the improvement which consists in carrying out said reaction in the presence of an alkali metal chloride and separating the obtained alkyl compound of said element from the formed aluminum chloride-alkali metal chloride complex compound.

2. The process as defined in claim 1 wherein the reaction is carried out in an inert organic solvent.

3. The process as defined in claim 1 wherein the obtained alkyl compound is used as a solvent.

4. In the preparation of boron triethyl by reaction of boron trichloride with aluminum triethyl at a temperature of 20 to 200° C. the improvement which consists in adding an alkali metal chloride in an amount which is at least substantially equimolar to the amount of said aluminum triethyl, thereby converting the aluminum trichloride formed during the reaction substantially to aluminum chloride-alkali metal chloride complex, and distilling off the formed boron triethyl from said complex.

5. In the preparation of alkyl compounds of elements of the group consisting of mercury, boron, and bismuth by reacting alkyl chlorides of said elements with alkyl aluminum compounds with formation of aluminum chloride, the improvement which consists in carrying out the reaction with addition of an alkali metal chloride, thereby complexing said aluminum chloride to an aluminum complex compound of the formula $$MeAlCl_yR_{4-y}$$

wherein Me is alkali metal, R is alkyl, and $y$ is an integer from 3 to 4, said compound being less volatile than aluminum chloride.

6. In the preparation of diethyl mercury by reaction of mercuric chloride with triethyl aluminum at a temperature of 30 to 80° C. the improvement which consists in carrying out the reaction in the presence of sodium chloride and distilling off the obtained diethyl mercury under vacuum.

7. In the preparation of triethyl bismuth by reaction of bismuth trichloride with triethyl aluminum at a temperature of about 50 to 70° C. the improvement which consists in carrying out the reaction in the presence of sodium chloride and distilling off the formed triethyl bismuth.

References Cited in the file of this patent

UNITED STATES PATENTS

| | | |
|---|---|---|
| 2,647,136 | Sauer | July 28, 1953 |
| 2,717,257 | Bluestein | Sept. 6, 1955 |
| 2,739,165 | Plueddemann | Mar. 20, 1956 |

FOREIGN PATENTS

| | | |
|---|---|---|
| 888,852 | Germany | Sept. 7, 1953 |
| 908,019 | Germany | Apr. 1, 1954 |
| 934,649 | Germany | Nov. 3, 1955 |
| 1,120,344 | France | Apr. 16, 1956 |

OTHER REFERENCES

Goubeau F.I.A.T. Reviews of Germany Science: Inorganic Chemistry, vol. I, pp. 215–238 (1948). (Pp. 224 and 228 relied on).